United States Patent [19]

Bifulco

[11] Patent Number: 5,716,086
[45] Date of Patent: Feb. 10, 1998

[54] PIZZA PADDLE APPARATUS

[76] Inventor: Phil Bifulco, 1604 NW. 34th Ter., Lauderhill, Fla. 33313

[21] Appl. No.: 785,036

[22] Filed: Jan. 17, 1997

[51] Int. Cl.$^6$ .................................................. A47J 43/28
[52] U.S. Cl. .................................................. 294/7; 294/49
[58] Field of Search .................... 294/1.1, 7, 8, 32, 294/49, 50, 54.5, 56, 59, 64.1, 64.3

[56] References Cited

U.S. PATENT DOCUMENTS

| | | | |
|---|---|---|---|
| 243,098 | 6/1881 | Becker et al. | 294/49 X |
| 1,075,459 | 10/1913 | Bowman | 294/49 |
| 1,747,258 | 2/1930 | O'Neil | 294/49 |
| 5,417,463 | 5/1995 | DiPaola | 294/7 |

FOREIGN PATENT DOCUMENTS 423424  9/1974  U.S.S.R. .................. 294/49

*Primary Examiner*—Johnny D. Cherry
*Attorney, Agent, or Firm*—Oltman, Flynn & Kubler

[57] ABSTRACT

A paddle apparatus for supporting a pizza includes a handle portion, a pizza supporting portion having a support surface with an air discharge port, an air source, and an air conduit interconnecting the air source and the air discharge port, so that a quantity of air is supplied by the air source and discharged through the air discharge port to dislodge the pizza from the support surface for removal of the pizza from the apparatus. The air conduit preferably includes a longitudinal passageway in the handle and pizza supporting portions, and opens through the discharge port out of the support surface. The air discharge port preferably includes a hole in the support surface with a disk insert having an opening at its center, the opening having a cross-section which is smaller than the cross-section of the passageway, for accelerating the speed of air delivered through the passageway by reducing the cross-sectional flow area. The passageway preferably includes a longitudinal channel recessed into the lower surface of the handle and pizza supporting portions, the channel having a cross-section which progressively narrows with depth, and a slat member fitted snugly and engagingly into the channel for completing the passageway. The slat member preferably includes a longitudinal groove to widen and round out the passageway. The air source preferably includes a squeeze bulb.

5 Claims, 1 Drawing Sheet

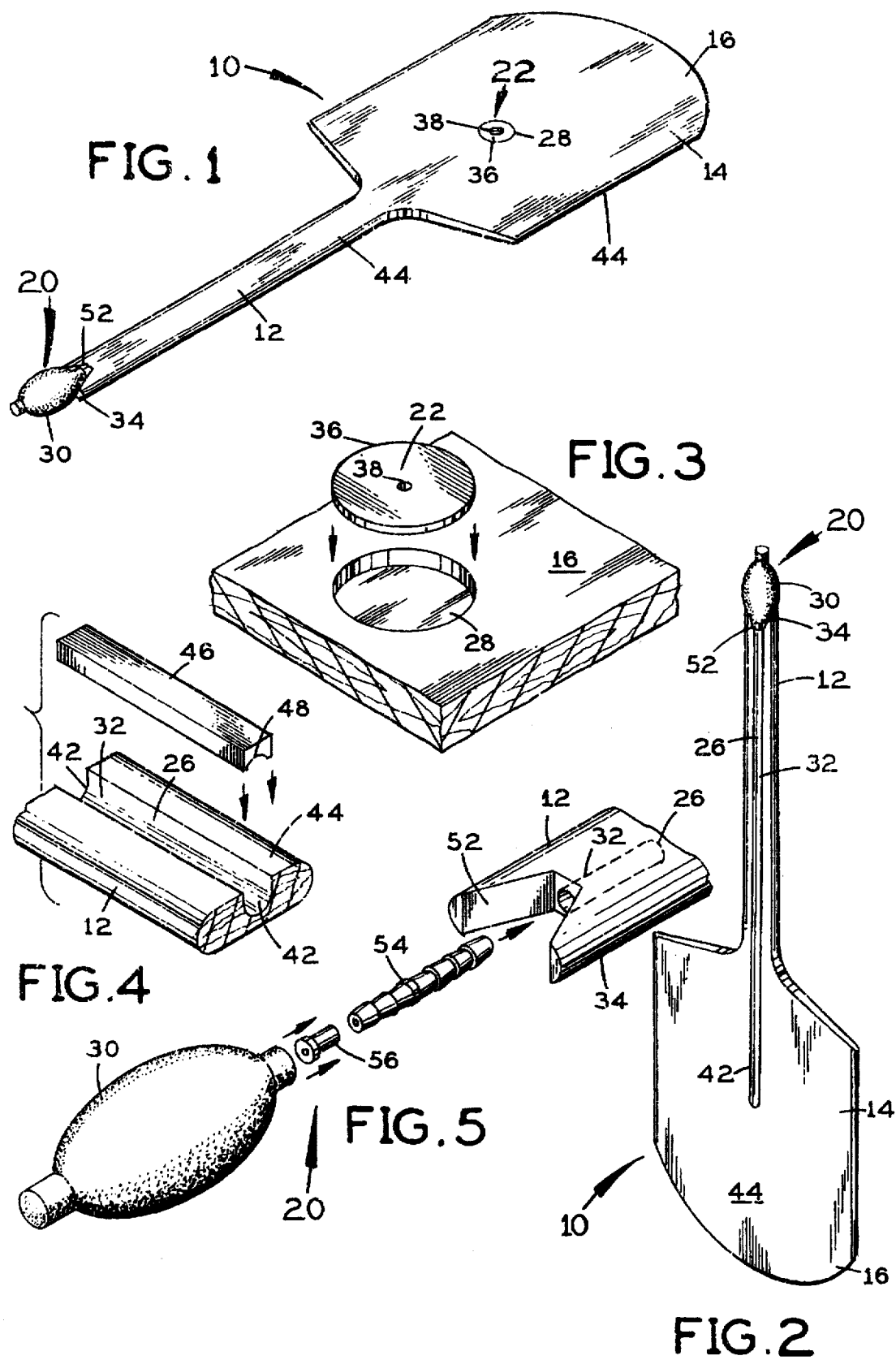

5,716,086

PIZZA PADDLE APPARATUS

BACKGROUND OF THE INVENTION

1. Field of the Invention

The present invention relates generally to the field of food item supporting and serving devices. More specifically, the present invention relates to a pizza supporting paddle apparatus including a handle portion and a pizza supporting portion having a planar support surface, an air source, an air conduit, and an air discharge port in the support surface. A quantity of air is propelled by the air source into the air conduit and is discharged through the air discharge port, dislodging the pizza from the support surface for easy removal and transfer to another surface.

The air conduit preferably includes a passageway extending longitudinally through the handle portion and into the pizza supporting portion to approximately the center of the support surface, and opens out of the support surface through the discharge port. The air source is preferably a hand squeeze bulb mounted at the handle portion proximal end.

2. Description of the Prior Art

There have previously been various kitchen paddles for supporting and carrying pizzas and other food items. A problem with these paddles has been that the food item often sticks to the paddle support surface so that removal of the food item from the paddle is awkward and potentially damaging to the food item.

It is thus an object of the present invention to provide a paddle apparatus for supporting a food item such as a pizza, which includes a mechanism for gently disengaging the pizza from the paddle with a discharge of air for easy removal.

It is another object of the present invention to provide such an apparatus which is simple in design and which can substantially conform to conventional pizza paddle configurations familiar to persons working in the industry.

It is still another object of the present invention to provide such an apparatus which is reliable and consistent with frequent use.

It is finally an object of the present invention to provide such an apparatus which is relatively inexpensive to manufacture.

SUMMARY OF THE INVENTION

The present invention accomplishes the above-stated objectives, as well as others, as may be determined by a fair reading and interpretation of the entire specification.

A paddle apparatus is provided for supporting a pizza, including a handle portion, a pizza supporting portion having a support surface with an air discharge port, an air source, and an air conduit interconnecting the air source and the air discharge port, so that a quantity of air is supplied by the air source and discharged through the air discharge port to dislodge the pizza from the support surface for removal of the pizza from the apparatus.

The air conduit preferably includes a longitudinal passageway in the handle and pizza supporting portions, and opens through the discharge port out of the support surface. The air discharge port preferably includes a hole in the support surface with a disk insert having an opening at its center, the opening having a cross-section which is smaller than the cross-section of the passageway, for accelerating the speed of air delivered through the passageway by reducing the cross-sectional flow area.

The passageway preferably includes a longitudinal channel recessed into the lower surface of the handle and pizza supporting portions, the channel having a cross-section which progressively narrows with depth, and a slat member fitted snugly and engagingly into the channel for completing the passageway. The slat member preferably includes a longitudinal groove to widen and round the passageway.

The air source preferably includes a squeeze bulb, and the apparatus preferably additionally includes a notch in the proximal end of the handle portion into which the passageway opens, for receiving the squeeze bulb, and an interconnection tube sealingly interconnecting the squeeze bulb and the passageway. The apparatus preferably additionally includes a check valve in fluid communication with the passageway between the air source and the air discharge port, for preventing air from flowing from the passageway back into the air source.

A paddle apparatus is also provided for supporting a food item, including an air delivery mechanism including an air source, and a food item supporting portion having a support surface with an air discharge port in fluid communication with the air source, so that a quantity of air is supplied by the air source and discharged through the air discharge port to dislodge the food item from the support surface for removal of the food item from the apparatus.

BRIEF DESCRIPTION OF THE DRAWINGS

Various other objects, advantages, and features of the invention will become apparent to those skilled in the art from the following discussion taken in conjunction with the following drawings, in which:

FIG. 1 is a perspective top view of the first preferred embodiment, showing the handle portion, air source receiving notch, squeeze bulb air source, pizza supporting portion and support surface, and the air discharge port.

FIG. 2 is perspective bottom view of the embodiment of FIG. 1, showing the air passageway with the slat member removed to reveal the passageway-defining channel.

FIG. 3 is a perspective, exploded close-up view of the hole in the pizza support surface and of the disk insert which fits into the hole.

FIG. 4 is a perspective, exploded out-take of the encircled region in FIG. 2, showing the channel and slat member.

FIG. 5 is a broken-away, perspective view of the proximal end of the handle portion, showing the squeeze bulb, check valve, interconnection tube and V-shaped air source mounting notch.

DETAILED DESCRIPTION OF THE PREFERRED EMBODIMENTS

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Referring to FIGS. 1–5, a paddle apparatus 10 is disclosed for supporting a food item such as a pizza, including a handle portion 12 and a pizza supporting portion 14 having a broad, planar support surface 16, and an air delivery mechanism 20 with a centrally located air discharge port 22. A quantity of air is supplied by air delivery mechanism 20 and discharged through air discharge port 22 to dislodge a pizza (not shown) resting on support surface 16 so that the pizza momentarily floats freely on a layer of discharged air moving between the pizza and support surface 16 for easy removal and transfer to another surface.

Air delivery mechanism 20 preferably includes an air source 30 and an air conduit 26 interconnecting air source 30 and discharge port 22. Air source 30 is preferably mounted at the handle portion proximal end 34. Air conduit 26 is preferably a passageway 32 extending longitudinally through handle portion 12 to approximately the center of support surface 16, and opens out of discharge port 22. See FIG. 2.

Discharge port 22 preferably includes a hole 28 in support surface 16 fitted with a disk insert 36. See FIG. 3. The disk insert 36 has an opening 38 at its center which is smaller in cross-section than passageway 32 for accelerating the speed of the air delivered through passageway 32.

Passageway 32 is preferably defined by a longitudinal channel 42 recessed into the handle portion 12 and supporting portion 14 lower surfaces 44, the channel 42 having a curved cross-section which progressively narrows with depth. See FIG. 4. A slat member 46 fits snugly into channel 42 along the entire channel 42 length to a sufficient depth to be flush with lower surface 44. Slat member 46 preferably includes a longitudinal groove 48 along its inserted face to widen and to round out the passageway 32 cross-section so that it is more regular and balanced in shape.

Proximal end 34 of handle portion 12 preferably includes a V-shaped notch 52. See FIG. 5. The air source 30, preferably in the form of a hand pump squeeze bulb, fits and mounts into notch 52, and an interconnection tube 54 is provided having a first end extending snugly and sealingly into the bulb air source 30 and a second end extending from the bulb air source 30 snugly and sealingly into passageway 32. A check valve 56 is preferably fitted into interconnection tube 54 to prevent air from flowing from the passageway 32 back into the bulb air source 30.

Other Preferred Embodiments

Many air sources 30 are contemplated other than the illustrated squeeze bulb, such as compressors, cartridges, foot pumps and hand pumps. A gas other than air may be supplied, such as carbon dioxide from a conventional $CO_2$ cartridge. It is also contemplated that handle portion 12 may be omitted, so that apparatus 10 is gripped along supporting portion 14.

Apparatus 10 can be made from many materials, including but not limited to wood, stainless steel, aluminum and synthetic substances such as various plastics. Apparatus 10 can be used not only for supporting pizzas, but also for many other food items including but once again not limited to pastries and bread.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A paddle apparatus for supporting a pizza, comprising:

a handle portion, a pizza supporting portion having a support surface with an air discharge port, an air source, and an air conduit interconnecting said air source and said air discharge port, such that a quantity of air is supplied by said air source and discharged through said air discharge port to dislodge the pizza from said support surface for removal of the pizza from the apparatus, said air conduit comprising a longitudinal passageway in said handle portion and pizza supporting portion, and opens through said discharge port out of said support surface, and said air discharge port comprising a hole in said support surface with a disk insert having an opening at its center, said opening having a cross-section which is smaller than the cross-section of said passageway, for accelerating the speed of air delivered through said passageway by reducing the cross-sectional flow area.

2. An apparatus according to claim 1, wherein said passageway comprises:

a longitudinal channel recessed into the lower surface of said handle portion and pizza supporting portion, said channel having a cross-section which progressively narrows with depth, and a slat member fitted snugly and engagingly into said channel for completing said passageway.

3. An apparatus according to claim 2, wherein said slat member comprises a longitudinal groove to widen and round out said passageway.

4. An apparatus according to claim 1, wherein said air source comprises a squeeze bulb, said apparatus additionally comprising:

a notch in the proximal end of said handle portion into which said passageway opens, for receiving said squeeze bulb, and an interconnection tube sealingly interconnecting said squeeze bulb and said passageway.

5. An apparatus according to claim 1, additionally comprising a check valve in fluid communication with said air conduit between said air source and said air discharge port, for preventing air from flowing from said passageway back into said air source.

* * * * *